(12) United States Patent
Krupka (10) Patent No.: US 10,230,934 B2
(45) Date of Patent: Mar. 12, 2019

(54) DEPTH MAP CORRECTION USING LOOKUP TABLES

(71) Applicant: MICROSOFT TECHNOLOGY LICENSING, LLC, Redmond, WA (US)

(72) Inventor: Eyal Krupka, Shimshit (IL)

(73) Assignee: MICROSOFT TEHCNOLOGY LICENSING, LLC, Redmond, WA (US)

( * ) Notice: Subject to any disclaimer, the term of this patent is extended or adjusted under 35 U.S.C. 154(b) by 647 days.

(21) Appl. No.: 13/917,974

(22) Filed: Jun. 14, 2013

(65) Prior Publication Data

US 2014/0368613 A1  Dec. 18, 2014

(51) Int. Cl.
*H04N 13/128* (2018.01)
*G01S 17/36* (2006.01)
*G01S 17/89* (2006.01)
*G01S 7/497* (2006.01)

(52) U.S. Cl.
CPC .......... *H04N 13/128* (2018.05); *G01S 7/497* (2013.01); *G01S 17/36* (2013.01); *G01S 17/89* (2013.01)

(58) Field of Classification Search
CPC .......... H04N 13/0007; H04N 13/0022; H04N 13/128; G01S 7/497; G01S 17/36; G01S 17/89
USPC .......................................... 348/46
See application file for complete search history.

(56) References Cited

U.S. PATENT DOCUMENTS

| 2005/0031199 A1* | 2/2005 | Ben-Chorin | G09G 5/02 |
| | | | 382/162 |
| 2009/0067506 A1* | 3/2009 | Doser | H04N 19/176 |
| | | | 375/240.18 |
| 2010/0231512 A1* | 9/2010 | Perez | A63F 13/10 |
| | | | 345/158 |

(Continued)

FOREIGN PATENT DOCUMENTS

| CN | 102262224 A | 11/2011 |
| EP | 1074855 A2 | 2/2001 |
| JP | H0682552 A | 3/1994 |

OTHER PUBLICATIONS

"International Search Report & Written Opinion for PCT Patent Application No. PCT/US2014/041828", dated Sep. 22, 2014, 11 Pages.

(Continued)

*Primary Examiner* — Mohammed S Rahaman
*Assistant Examiner* — Jimmy S Lee (57) ABSTRACT

Depth map correction using lookup tables is described. In an example depth maps may be generated that measure a depth to an object using differences in phase between light transmitted from a camera which illuminates the object and light received at the camera which has been reflected from the object. In various embodiments depth maps may be subject to errors caused by received light undergoing multiple reflections before being received by the camera. In an example a correction for an estimated depth of an object may be computed and stored in a lookup table which maps the amplitude and phase of the received light to a depth correction. In an example the amplitudes and frequencies of each modulation frequency may be to access lookup table which stores corrections for the depth of an object and which allows an accurate depth map to be obtained.

20 Claims, 8 Drawing Sheets

(56) References Cited

U.S. PATENT DOCUMENTS

| | | | |
|---|---|---|---|
| 2011/0141114 A1* | 6/2011 | Chen | G06F 3/012 345/428 |
| 2011/0176709 A1* | 7/2011 | Park | G06T 7/521 382/106 |
| 2011/0229042 A1* | 9/2011 | Iwamoto | G06K 9/3233 382/195 |
| 2011/0273561 A1* | 11/2011 | Oggier | H04N 5/37452 348/135 |
| 2011/0304696 A1* | 12/2011 | Centen | G01S 17/89 348/46 |
| 2011/0310376 A1 | 12/2011 | Shim et al. | |
| 2012/0008128 A1 | 1/2012 | Bamji | |
| 2012/0033045 A1* | 2/2012 | Schweizer | G01S 7/4912 348/46 |
| 2012/0105585 A1* | 5/2012 | Masalkar | H04N 13/0022 348/46 |
| 2013/0116977 A1* | 5/2013 | Godbaz | G01S 17/89 702/189 |
| 2014/0085398 A1* | 3/2014 | Tian | H04N 7/15 348/14.01 |

OTHER PUBLICATIONS

Jimenez, et al., "Modelling and Correction of Multipath Interference in Time of Flight Cameras", In Proceeding of the IEEE Conference on Computer Vision and Pattern Recognition, Jun. 16, 2012, 8 pages.

Park, et al., "Real Time Rectification Using Differentially Encoded Lookup Table", In Proceedings of the 5th International Conference on Ubiquitous Information Management and Communication, Feb. 21, 2011, 4 pages.

Karel, et al., "Quantifying the Distortion of Distance Observations Caused by Scattering in Time-of-Flight Range Cameras", In Proceeding of the International Archives of Photogrammetry, Remote Sensing and Spatial Information Sciences, vol. XXXVIII, Part 5, Jun. 21, 2010, 6 pages.

Dorrington, et al., "An Evaluation of Time-of-Flight Range Cameras for Close Range Metrology Applications", In Proceeding of the International Archives of Photogrammetry, Remote Sensing and Spatial Information Sciences, vol. XXXVIII, Part 5, Jun. 21, 2010, 6 pages.

Dorrington, et al., "Separating True Range Measurements from Multi-Path and Scattering Interference in Commercial Range Cameras", In Proceedings of Three-Dimensional Imaging, Interaction, and Measurement, Jan. 27, 2011, 10 pages.

Fuchs, Stefan, "Multipath Interference Compensation in Time-of-Flight Camera Images", In Proceedings of the 20th International Conference on Pattern Recognition, Aug. 23, 2010, 4 pages.

Lee, Seungkyu, "Depth Camera Image Processing and Applications", In Proceeding of the 19th IEEE International Conference on Image Processing, Sep. 30, 2012, 4 pages.

"First Office Action and Search Report Issued in Chinese Patent Application No. 201480033840.6", dated Jan. 25, 2017, 13 Pages.

* cited by examiner

DEPTH MAP CORRECTION USING LOOKUP TABLES

BACKGROUND

Time-of-flight (TOF) cameras are increasingly used in a variety of applications, for example, human computer interaction, automotive applications, measurement applications and machine vision. A TOF camera can be used to generate depth maps which contain information relating to the depth of an object in a scene from the camera. The depth refers to the projection of distance on an imaginary line that extends from the camera, where the distance is the absolute radial distance. A light source at the TOF camera illuminates the scene and the light is reflected by objects in the scene. The camera receives the reflected light that, dependent on the distance of an object to the camera, experiences a delay. Given the fact that the speed of light is known, a depth map may be generated. As the calculations required to extract the depth from the received light signal require a minimal amount of computation TOF cameras are ideal for real time applications.

However, the time of flight measurement may be subject to a number of errors and uncertainties which can lead to errors in the computed depth maps. For example, the reflected light may undergo multiple reflections from different surfaces within the scene which may cause significant errors in the calculated depth.

The embodiments described below are not limited to implementations which solve any or all of the disadvantages of known methods of depth map correction using lookup tables

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Depth map correction using lookup tables is described. In an example depth maps may be generated that measure a depth to an object using differences in phase between light transmitted from a camera which illuminates the object and light received at the camera which has been reflected from the object. In various embodiments depth maps may be subject to errors caused by received light undergoing multiple reflections before being received by the camera. In an example a correction for an estimated distance of an object from the camera may be computed and stored in a lookup table which maps the amplitude and phase of the received light to a distance correction. In an example the amplitude and phase of each of a plurality of modulation frequencies may be used to access a lookup table which stores corrections for the distance of an object and which allows an accurate depth map to be obtained.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for depth map correction using lookup tables having data for two-path reflection, the system described is provided as an example and not a limitation. As those skilled in the art will appreciate, the present examples are suitable for application in a variety of different types of depth map correction systems such as those correcting for more than two paths of reflection.

In an embodiment phase modulation time of flight depth cameras may be used for human computer interaction, for example interaction with a gaming system. Phase modulation time of flight depth cameras can generate depth maps in near real time and are therefore suitable for tracking movements of humans, for example, gestures used for interacting with electronic devices, e.g. game consoles, televisions and other electronic devices. In other embodiments phase modulation time of flight depth cameras may be used for range measurement, automotive applications e.g. parking sensors and collision avoidance systems and other applications where accurate distances to objects are measured. The terms "camera" and "depth camera" are used herein interchangeably with "phase modulation time of flight camera".

Figure 1:
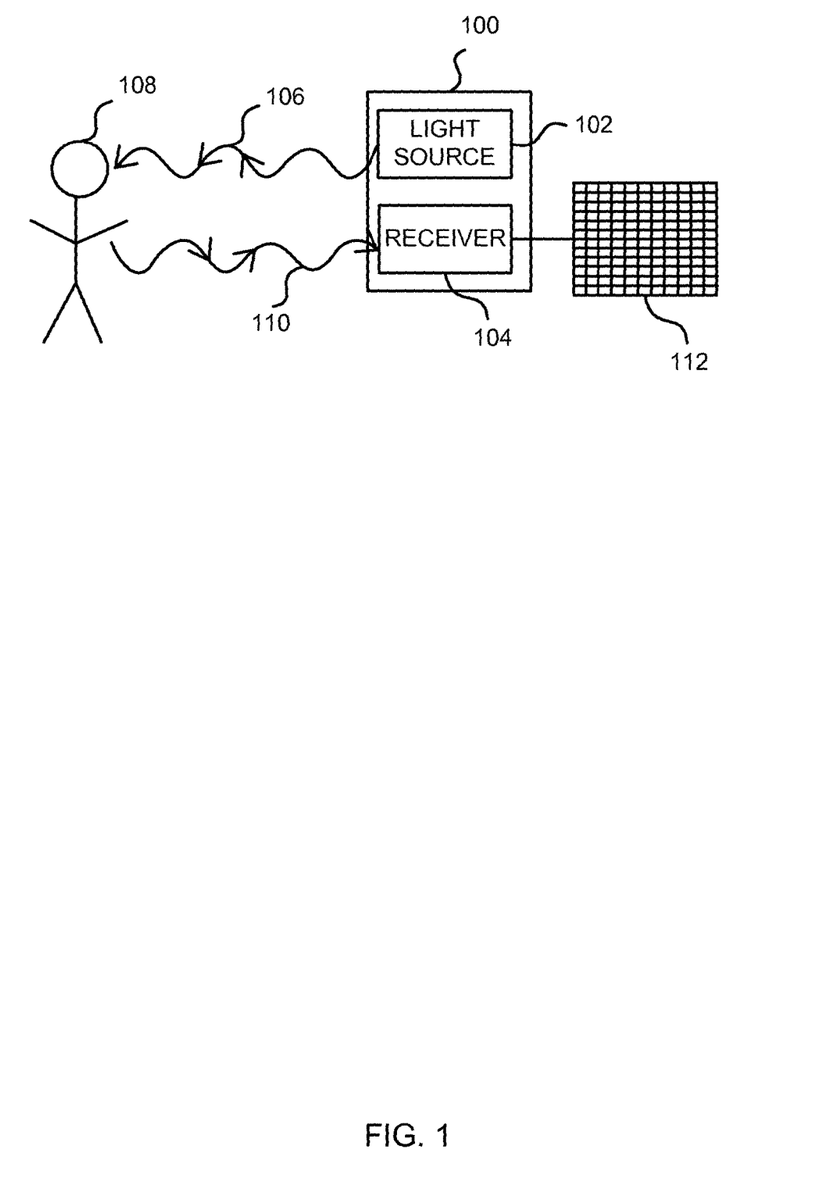
FIG. 1 is a schematic diagram of generating a depth map using a phase modulation time of flight depth camera.

FIG. 1 is a schematic diagram of generating a depth map using a phase modulation time of flight depth camera. A depth camera 100 comprises a light source 102 and a receiver 104. The light source 102 may be arranged to emit modulated light. In an example, the source 102 of modulated light may be an incoherent light source which emits transmitted light 106 that is modulated with a signal at a frequency $f_{mod}$. In an example the light from the device may be modulated at a high frequency e.g. a frequency in the MHz range, such that the amount of illumination changes periodically. In an example the periodic change of illumination may take the form of a sinus function.

In an example, the source 102 of modulated light emits light at multiple modulation frequencies, for example three modulation frequencies. The light source 102 may be selected so that the wavelength of the emitted light is the most appropriate wavelength for a particular application. In an example the light source may be a non-visible light source e.g. a near infra-red light source. In another example the light source may be a visible light source. In an embodiment the light source may be selected to be a source of light of an appropriate wavelength for the application for which it is intended.

The source of modulated light may illuminate an object 108 within the field of the camera and at least some of the light may be reflected back toward the camera from the object. In an example the detected object may be a person; however a depth map may be generated of any object. The reflected light 110 may be detected by the receiver 104. In an example, the reflected light is also modulated and the reflected light 110 may be out of phase with the transmitted light 106 due to the delay caused by the distance the light has travelled on the return trip between the camera and the object. For each pixel 112 of the receiver 104 the amplitude and phase difference of the received signal relative to the transmitted light may be determined for each modulation frequency. In an example a depth map may computed from the amplitude and phase measurements at each pixel 112 which includes both intensity and distance information for objects in a scene, for example, to a user who is interacting with a game system.

Figure 2:
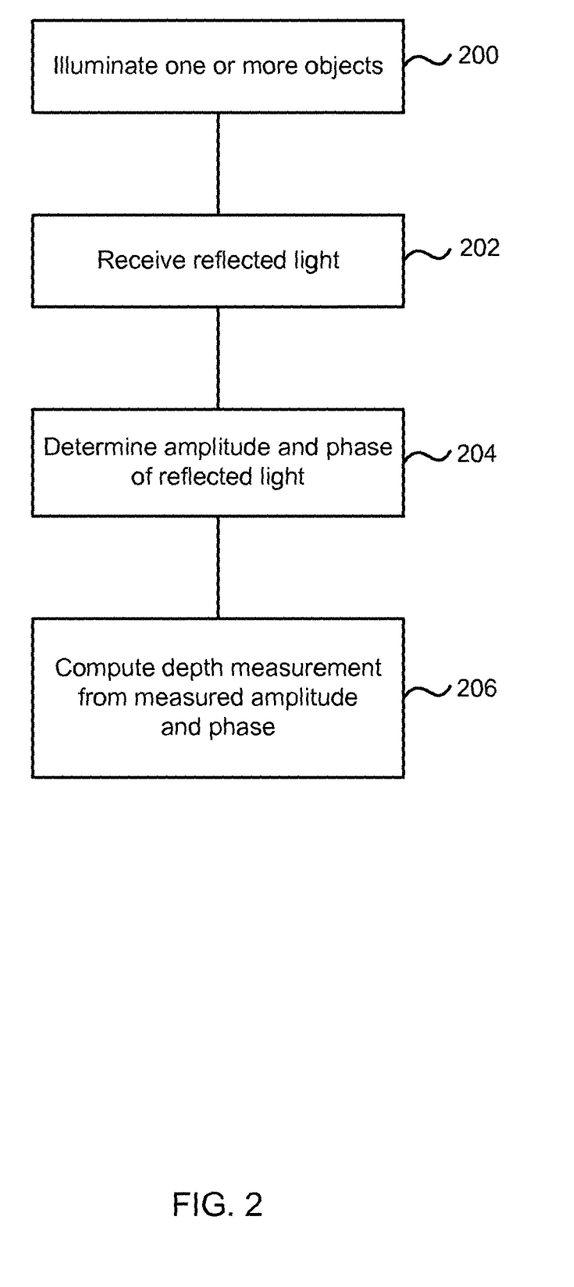
FIG. 2 is a flow diagram of an a example method of computing a depth map.

FIG. 2 is a flow diagram of an example method of computing a depth map. As described in detail above, a light source at a phase modulation time of flight depth camera illuminates 200 one or more nearby objects. The light source may be a light source that is modulated at one or more frequencies. Light that is reflected from nearby objects may be received 202. For example, the amplitude and phase measurements may be amplitude and phase measurements of light detected by the depth camera that are received at a processor. The processor may be a processor at a depth camera or at another computing device. In an example, the reflected light may be modulated at the same frequency or frequencies as the light source and the amplitude and phase of the received reflected light may be determined 204 for each modulation frequency at each pixel of a depth camera receiver at which the light is received.

The processor may be arranged to compute 206 a depth map from the measured amplitude and phase of the reflected light by computing a distance measurement for each pixel of the depth camera receiver. The amplitude of the light received at each pixel can be used to generate an intensity map, or 2-D image. The depth of objects from the camera may be determined from a phase shift of the reflected light relative to the transmitted light. Given that the speed of light is a known constant, the depth of an object (in meters) may be computed from the phase shift (in radians) as:

$$d = \frac{c}{2f_{mod}} \cdot \frac{\varphi}{2\pi}$$

where c in meters/second is the speed of light, $f_{mod}$ in MHz is the modulation frequency and $\varphi$ is the phase shift in radians. Therefore, an intensity and distance may be determined for each pixel of the receiver and a depth map may be generated at a resolution dependent on the resolution of the receiver i.e. a depth map generated from modulated light received at a receiver with 10000 pixels will have a higher resolution than a depth map generated from modulated light received at a receiver with 1000 pixels.

The quantity $c/(2f_{mod})$ is the maximum distance that can be measured unambiguously by the depth camera if only a single frequency is used. Therefore the one or more modulation frequencies may be selected to provide a distance measurement that is most appropriate for the application being used. In one example, where the depth camera is used with a gaming system, the one or more modulation frequencies may be selected to provide maximum unambiguous distance measurements which are approximately equivalent to the dimensions of a room. For example if the maximum unambiguous distance measurement required was in the range 4-10 meters the modulation frequencies may be selected to be in the range 15-37.5 MHz However, in another example multiple modulation frequencies may be combined to give an unambiguous measurement. The computed depth map may be subject to errors which lead to uncertainty in the distance determination. A source of errors is multipath reflection, where one or more reflections of light from different surfaces than the target object cause large distance distortions.

Figure 3:
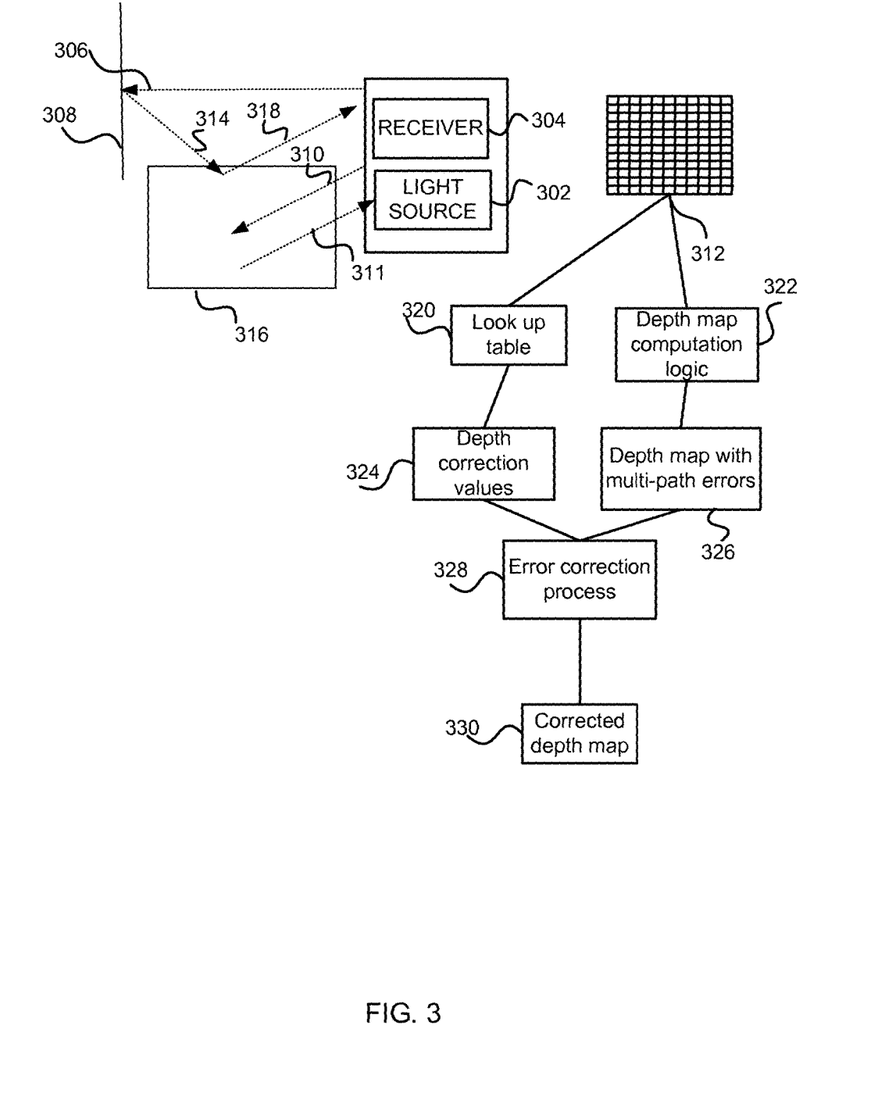
FIG. 3 is a schematic diagram of generating a depth map with reflection using a phase modulation time of flight depth camera.

FIG. 3 is a schematic diagram of generating a depth map with multipath reflection using a phase modulation time of flight depth camera. As described above with reference to FIG. 1 a depth camera 300 comprises a light source 302 and a receiver 304. The light source 302 may be arranged to emit modulated light. In an example, the source 302 of modulated light may be an incoherent light source which emits transmitted light 306 that is modulated with a signal at a frequency $f_{mod}$. In another example the light source may be arranged to emit light at multiple modulation frequencies $f_1$, $f_2$, . . . , $f_n$. In an example, only a single modulation frequency is emitted at a given time, for example, the camera may sequentially switch between modulation frequencies.

The source 302 of modulated light may illuminate an object such as floor 316 within the field of view of the camera and at least some of the light may be reflected back toward the camera directly from the object (i.e following the path shown by arrows 310-311 in FIG. 3). In an example the detected object may be floor 316, which may be specular; however a depth image may be generated of any object. The reflected light 314 may not be follow a direct path from the camera to the object and back to toward the camera but may undergo further reflections from other objects within the camera scene, for example, light may initially be reflected from the wall 308 before undergoing further reflections 318 e.g. a reflection from the floor 316. The reflected light 318 may be detected by the receiver 304. The reflected light 318 may be out of phase with the transmitted light 306. However, as the path of the reflected light is not direct path from the camera to the object 308 and then returning to the camera then the time of flight determination to the object 3 is not accurate. For each pixel 312 of the receiver 304 the amplitude and phase of the received signal may be determined for each modulation frequency, however the computed distance will not be accurate because the received light is a mixture of light which has followed a return path directly between the wall and the camera and the light which has additionally reflected off the floor.

In order to estimate the distance in the presence of multipath reflection it may be required to solve complex optimization problems which are processor intensive and may prevent real-time operation of the depth camera. One possible method of estimating distance in the presence of multipath reflection is to execute these calculations off-line. In one example these calculations may be carried out as a one-time process when designing the camera and a lookup table may be generated which maps each measurement to an optimized distance. In an embodiment a lookup table is a single dimensional list or multi-dimensional array, for example a two or higher dimensional array, which is used to store distance correction values which may be associated with amplitude and phase measurements of a received signal. The lookup table may be stored in memory and values stored in the lookup table may be restored from memory rather than being computed each time. For example, the values may be restored from memory to reduce the amount of processing required to compute a depth map.

For example, a look up table 320 may have been computed off-line and may store distance correction values for many combinations of amplitude and phase at one or more different modulation frequencies. A depth map computation logic 322 is able to take input from the receiver pixels 312 and use those to compute a depth map 326 which comprises multi-path errors. The input from the receiver pixels 312 may also be used to look up distance correction values 324 from the look up table 320. The distance correction values may be applied to the depth map 326 in an error correction process 328 to obtain a corrected depth map 330. More detail about how a look up table may be formed is now given with reference to FIG. 4 below.

Figure 4:
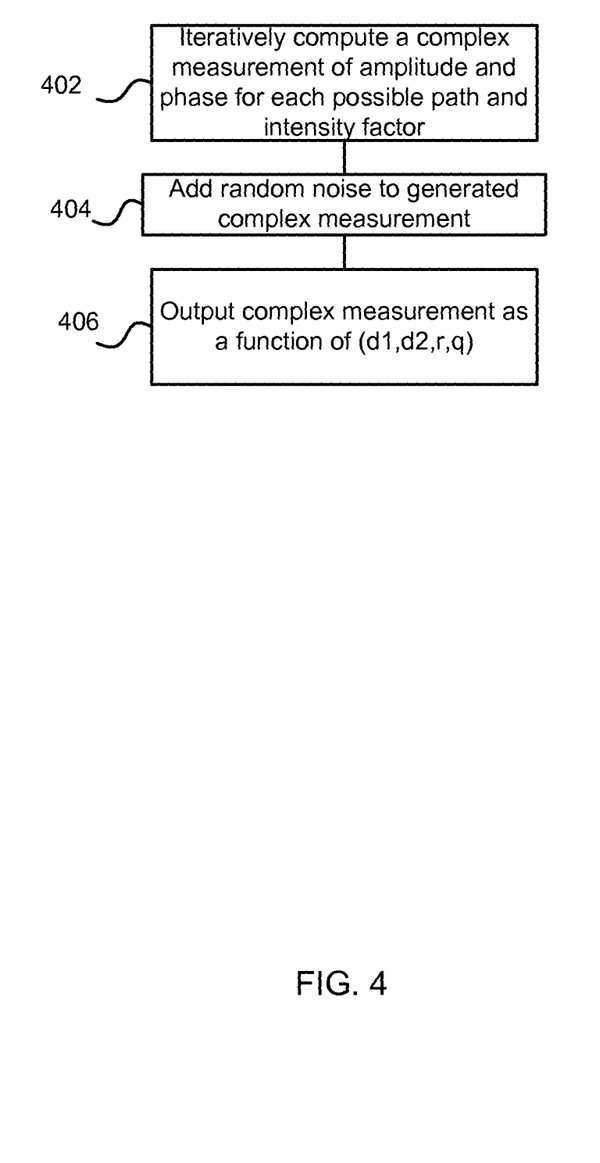
FIG. 4 is a flow diagram of an example method of generating complex measurements comprising amplitude and phase information.

FIG. 4 is a flow diagram of an example method of generating complex measurements comprising amplitude and phase information.

In an example, it can be assumed that, ignoring multipath reflection, where the modulation frequency i and the distance to the target is $d_i$ the complex measurement of the modulation frequency is:

$$\tilde{v}_l = Ae^{2\pi j \frac{d_1}{\lambda_i}}$$

where $j=\sqrt{-1}$, $\lambda_i$ is the wavelength of the modulation frequency i, defined as $\lambda_i=2c/f_i$ where c is the speed of light and $f_i$ is the modulation frequency.

In an example there is a second path, corresponding to a two-path case e.g. there is a reflection from a specular object. In an example amplitude parameters and phase parameters comprise the amplitude and phase of light received at a receiver, wherein the received light has undergone two path reflection (as described in FIG. 3). At distance $d_2$ and intensity factor ρ the complex measurement of the modulation frequency i becomes:

$$\tilde{v}_l = Ae^{2\pi j \frac{d_1}{\lambda_i}} + A\rho e^{2\pi j \frac{d_2}{\lambda_i}}$$

where $\Delta=d_2-d_1$, $\tilde{v}_l$ becomes:

$$\tilde{v}_l = Ae^{2\pi j \frac{d_1}{\lambda_i}}(1 + \rho e^{2\pi j \frac{\Delta}{\lambda_i}})$$

In an example where there are three modulation frequencies ($f_1$, $f_2$, $f_3$), the received signal for each modulation frequency may be represented by ($\tilde{v}_1$, $\tilde{v}_2$, $\tilde{v}_3$), where ($\tilde{v}_1$, $\tilde{v}_2$, $\tilde{v}_3$) denote the complex measurements of each modulation frequency. The amplitude and phase of each of the frequencies may be represented by $\tilde{a}_l=|\tilde{v}|$ and $\tilde{\theta}_l$=angle $(\tilde{v}_1)$ respectively for each frequency l=1,2,3. In an example, $z \in \{1,2,3\}$ is the index of the reference frequency, which may be the frequency that has the highest measured amplitude. In other examples, other reference frequencies may be used.

In an example, for many possible values of each path $d_1$, $d_2$ and intensity factor ρ a complex measurement may be iteratively computed 402. For example complex measurements may be computed for $d_1$ in the range 50 cm-500 cm in steps of 1 cm. $d_2$ is larger than $d_1$ since $d_1$ represent the shortest or most direct path between an object and the camera. In an example $d_2$ may be larger than $d_1$ by a fixed amount. For each $d_1$, $d_2$ three complex measurement may be computed according to:

$$\tilde{v}_l = Ae^{2\pi j \frac{d_1}{\lambda_i}} + A\rho e^{2\pi j \frac{d_2}{\lambda_i}}.$$

Where l=1,2,3 and A represents the amplitude. In an example A may be 1 or any other positive number.

In an example, random noise may be added 404 to the complex measurements in order to simulate camera noise or other potential errors. For example, for each (d1, d2, ρ) above, Q points may be generated, where for each point different random noise is added as follows.

$$\tilde{v}_l = Ae^{2\pi j \frac{d_1}{\lambda_i}} + A\rho e^{2\pi j \frac{d_2}{\lambda_i}} + \text{rand\_noise}$$

where rand_noise may be a complex valued random noise. In an example the noise may be a Gaussian noise. In a further example the noise may be sampled independently for each of the Q points. Therefore, various measurements may be generated 406 where the source is [d1, d2, ρ, q], where q=1, . . . , Q is the index of the random noise point.

In an example, the complex measurements may be mapped to depth map values by generating a six dimensional lookup table. In an example where there are two dimensions per modulation frequency (real and imaginary or amplitude and phase) the lookup table will map from the 6 measurements (two per modulation frequency) to depth. Each dimension is quantized to bins. However, in this approach the lookup table size will be in order of $K^6$ elements, where K is the number of bins used for each dimension. As an example, if K=100, an order of 10G words of memory is used.

Figure 5:
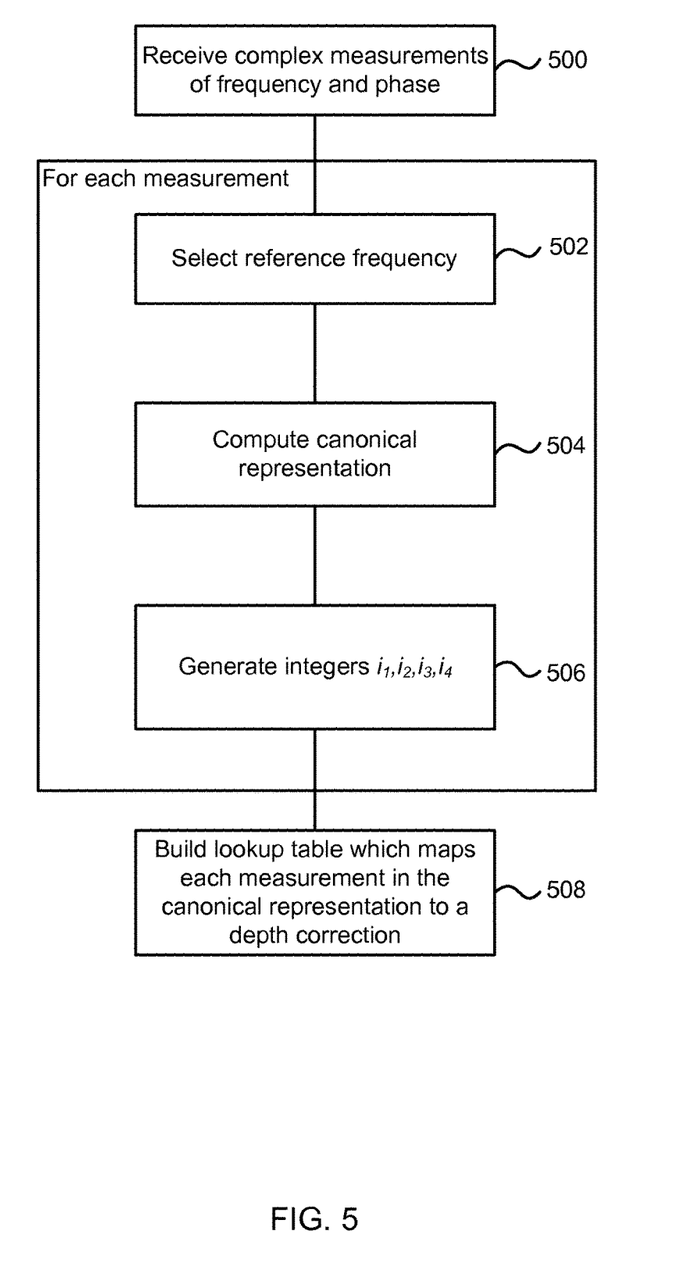
FIG. 5 is a flow diagram of an example method of generating a memory efficient lookup table.

FIG. 5 is a flow diagram of an example method of generating a memory efficient lookup table. In an example a canonical multipath representation of frequency and phase may be defined. Although the examples herein are described with reference to a two-path reflection from e.g. reflections from a specular object that has mixed Lambertian reflections and reflection from some object (see FIG. 3), they may be generalized to multipath reflection. In an example complex measurements may be generated as described above with reference to FIG. 4. The complex measurements may be received 500 at a processor.

A reference frequency is selected 502 for each of simulated complex measurements. As noted above, this may be selected by specifying that the modulation frequency with the largest amplitude is to be set as the reference frequency.

In an example each of the complex measurements of frequency and phase may be converted into an integer z, 4 integer numbers ($i_1$, $i_2$, $i_3$, $i_4$) and a reference distance $d_{ref}$, where the amplitude and phase of each of the frequencies are represented by $\tilde{a}_l = |\tilde{v}_l|$ and $\tilde{\theta}_l = \text{angle}(\tilde{v}_l)$ respectively for each frequency l=1,2,3. In an example the index of the reference frequency $z \in \{1,2,3\}$ may be used to compute 504 a canonical representation which comprises the variables $\{d_{ref}, v_1, v_2, v_3\}$ which are computed according to:

$$v_l = \frac{\tilde{a}_l}{\tilde{a}_z} e^{j\left(\tilde{\theta}_l - \tilde{\theta}_z \frac{f_l}{f_z}\right)} \text{ and;}$$

$$d_{ref} = \tilde{\theta}_l \frac{c}{2 f_z}$$

In an example the canonical representation has the properties that $v_z = 1$, therefore, one of the complex numbers is constant, this reduces the dimensions of the representation. A further poperty is that $|v_l| \leq 1$ for every l.

The selected reference frequency 502 and canonical representation 504 may then be used to generate 506 integers ($i_1$, $i_2$, $i_3$, $i_4$) according to, for example:

where $z = 1$ $$i_1 = \text{floor}\left\{\frac{\text{Real}(v_2) - 1}{2 * K}\right\}, i_2 = \text{floor}\left\{\frac{\text{imaginary}(v_2) - 1}{2 * K}\right\}$$

$$i_3 = \text{floor}\left\{\frac{\text{Real}(v_3) - 1}{2 * K}\right\}, i_4 = \text{floor}\left\{\frac{\text{imaginary}(v_3) - 1}{2 * K}\right\}$$

where $z = 2$ $$i_1 = \text{floor}\left\{\frac{\text{Real}(v_1) - 1}{2 * K}\right\}, i_2 = \text{floor}\left\{\frac{\text{imaginary}(v_1) - 1}{2 * K}\right\}$$

$$i_3 = \text{floor}\left\{\frac{\text{Real}(v_3) - 1}{2 * K}\right\}, i_4 = \text{floor}\left\{\frac{\text{imaginary}(v_3) - 1}{2 * K}\right\}$$

where $z = 3$ $$i_1 = \text{floor}\left\{\frac{\text{Real}(v_1) - 1}{2 * K}\right\}, i_2 = \text{floor}\left\{\frac{\text{imaginary}(v_1) - 1}{2 * K}\right\}$$

$$i_3 = \text{floor}\left\{\frac{\text{Real}(v_2) - 1}{2 * K}\right\}, i_4 = \text{floor}\left\{\frac{\text{imaginary}(v_2) - 1}{2 * K}\right\}$$

where K is an integer number that describes the size of each dimension of the lookup table which is to be built and $i_1$, $i_2$, $i_3$, $i_4$ are integer numbers in the range 0 to K−1. Floor may be a function that is used to round the value of i down. $i_1$, $i_2$, $i_3$, $i_4$ may be truncated to the range 0 to K−1 to ensure that they are valid indices in the lookup table. In an example, the original six dimensional measurements may be converted into 5 integers $\{z, i_1, i_2, i_3, L_l\}$ and a side parameter $d_{ref}$. Since only $i_1$, $i_2$, $i_3$, $i_4$ are used to access the lookup table, the lookup table may be reduced to 4 dimensions, and the number of elements may be reduced to $K^4$. Since z is an integer between 1 and 3 there may be 3 such lookup tables. Each cell in the three look up tables may be associated with multiple distances. However, a single distance decision per cell can be assigned, for example, by averaging, by setting a look up table cell entry to "unknown distance" where the variance of the counterpart entries is above a threshold, or by setting a look up table cell entry to "unknown distance" where the number of counterpart entries is below a threshold.

In an embodiment, therefore, the simulated points may be used to build a lookup table that maps 508 each measurement in the canonical representation (z, $i_1$, $i_2$, $i_3$, $i_4$) to a depth correction. For example this correction may be $d_{cor} = d_1 - d_{ref}$. The further lookup table may have fewer dimensions than the initially computed measurements.

The lookup table retains sufficient information to enable correction of a distance computed from amplitude and phase information received at the camera. In an example, the further lookup table may be reduced to four dimensions. In an example, the memory required to store a four dimensional lookup table, as compared to a six dimensional lookup table is reduced by order of $K^2$. The further lookup table may be stored in a memory of reduced size because the memory used to store a lookup table scales exponentially with the number of dimensions. The lookup table may further be accessed more quickly as access time to a smaller table is often faster (e.g., when the table fits into a cache). Therefore accurate, memory efficient and real-time corrections for multipath reflection may be executed.

In an example a lookup table may be generated as a one-time process carried out offline during the development of a phase modulation time of flight camera, for example the lookup table may be generated during a calibration process. The lookup table may be stored at the camera or on another device in communication with the camera, for example at a games console, personal computer or mobile device or an entity in the cloud. The lookup table may be accessed during the generation of real-time depth maps to obtain a correction for estimated object distances so that accurate distances for objects within the field may be computed.

Figure 6:
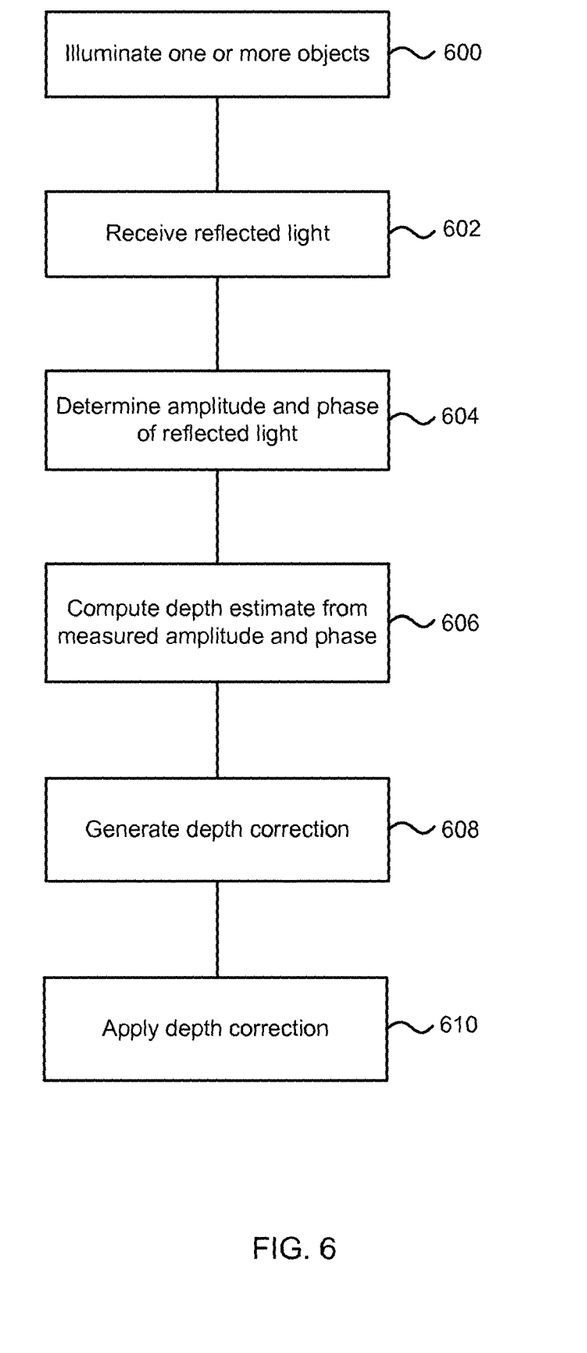
FIG. 6 is a flow diagram of an example method of generating a depth map corrected for multipath reflection.

FIG. 6 is a flow diagram of an example method of generating a depth map corrected for multipath reflection. As described above with reference to FIG. 2, a light source at a phase modulation time of flight depth illuminates 600 one or more nearby objects using a modulated light source. Light reflected from nearby objects is received 602 at a receiver of the depth camera and the amplitude and phase of the received reflected light may be determined 604 for each modulation frequency at each pixel of an image sensor.

Therefore, an intensity and estimated distance of an object may be computed 606 by a processor from the difference in phase between light transmitted from the light source and the light received at the receiver. In an example, the received light may have undergone at least a two path reflection. In another example the light may have undergone multipath reflection.

A distance correction $d_{corr}$ may be generated 608 by the processor from normalized amplitudes and shifted phases (i.e. —canonical representations as described above and shown in FIG. 5) in a previously stored lookup table. For example, a processor receives three amplitude measurements and three phase measurements from a pixel 312 (see FIG. 3) of a receiver. (The amplitude and phase measurements are at each of three different modulation frequencies in this example). A look up table 320 is accessible and has a known number of dimensions. For example, it is a four dimensional look up table wherein the number of dimensions in the lookup table which associates the measurements to $d_{corr}$ has been reduced to $i_1$, $i_2$, $i_3$, $i_4$ relative to the initial amplitude and frequency measurements. For example, associating an amplitude and phase measurement for each frequency for every measured distance would require a six dimensional lookup table. The number of dimensions may be reduced using the dimensionality reduction process described above with reference to FIG. 5. Other dimensions of look up table may be used.

The received amplitude and phase measurements are converted into the appropriate canonical representation according to the known dimensionality of the look up table. The converted measurements comprise complex values for each modulation frequency and a side parameter (phase value). The converted measurements are used to index an entry in the look up table and obtain a depth correction value.

In one example the lookup table is stored at the depth camera, for example in ROM memory or on an integrated storage device, e.g. a hard-disk drive or memory card. In other examples the lookup table may be stored at a computing device arranged in communication with the depth camera. The distance correction may be applied 610 by the processor to the estimated distance to generate a corrected distance for the object. In an example, applying the distance correction to generate a corrected distance comprises executing the correction: $d_1 = d_{ref} + d_{corr}$.

For example, where the depth camera is used with a gaming system for generating depth maps of a person playing a game the corrections stored at the lookup table may be used to correct distances and generate an accurate depth map which enables gestures made by the person to be recognized by the system. In an example the lookup table is stored in a memory of the depth camera. In another example the lookup table may be stored at a memory of the gaming system.

Figure 7:
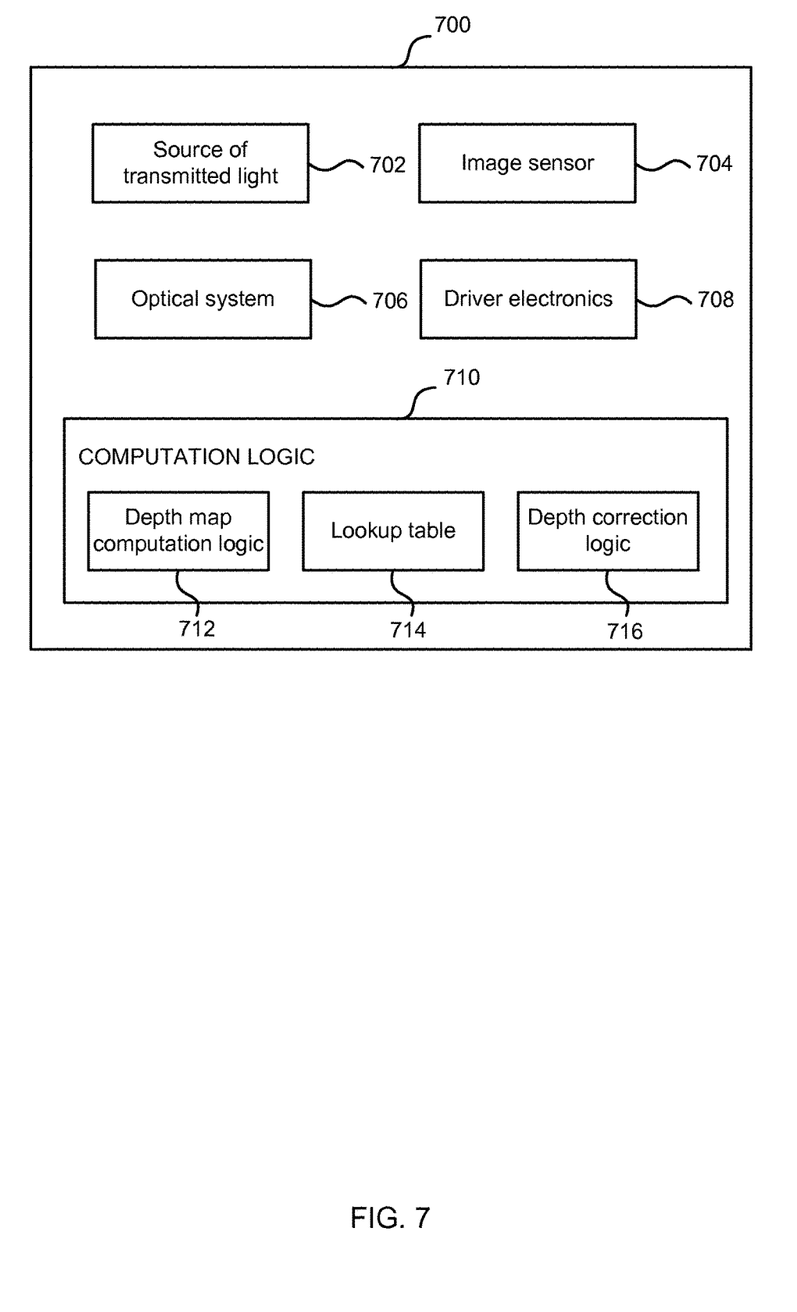
FIG. 7 is a schematic diagram of an example phase modulation time of flight depth camera.

FIG. 7 is a schematic diagram of a phase modulation time of flight depth camera. A phase modulation time of flight depth camera 700 may comprise a source of transmitted light 702. In an example the source of transmitted light is an incoherent light source. In another example the source of transmitted light is an coherent light source. An example of an appropriate light source is a near infra-red laser or LED however another appropriate light source may be used. The transmitted light may be modulated at a modulation frequency. In an example the modulation frequency may be an RF frequency in the range kHz-GHz, for example the modulation frequency may be in the MHz range.

A phase modulation time of flight depth camera may further comprise an image sensor 704 that receives light reflected from objects within the scene. The image sensor 704 may comprise a CCD sensor, a CMOS sensor, for example a Photonic Mixer Device (PMD) sensor or other appropriate sensor which may be arranged to detect light reflected from objects, people and surfaces within the camera range.

The camera may further comprise an optical system 706 that is arranged to gather and focus reflected light from the environment on to the image sensor 704. In an example the optical system may comprise an optical band pass filter, which may enable only light of the same wavelength as the light source to be received by the sensor. The use of an optical band pass filter may help to suppress background light. The camera may also comprise driver electronics 708 which control both the light source and an image sensor, for example, to enable highly accurate phase difference measurements to be made.

In one example the camera may comprise computation logic 710. In an embodiment computation logic may be arranged to execute the methods described herein with reference to FIG. 5. In an example, the described methods may be executed as a one-time process during camera testing and calibration.

Computation logic may further comprise integrated depth map computation logic 712, distance correction logic 716 and a distance correction lookup table 714 stored at a memory. In an example depth map computation logic 712 may be arranged to estimate a distance of an object from the difference in phase between light transmitted from the light source and the light received at the receiver. In various examples the received light has undergone at least two path reflection e.g. multipath reflection.

The lookup table 714 may store an association between measured amplitudes and phases and distance corrections as described above. In an example the stored lookup table may contain a measurement of the adjusted amplitude and phase of each of the plurality of modulation frequencies for each pixel of the image sensor 704. In an example the adjusted amplitude and phase may be the normalized amplitude and phase. A side parameter may be stored with the lookup table which comprises phase information e.g. phase rotation.

In an example depth map correction logic 716 may be used access the lookup table 714 and generate a distance correction from the normalized amplitudes and phases stored in the stored lookup table 714 and the side parameter. Depth map correction logic 716 may be arranged to apply the generated distance correction to the estimated distance computed by depth map computation logic 712 to generate a corrected distance for the object.

In other examples, the computation logic 710 comprising depth map computation logic 712, depth correction logic 716 and lookup table 714 may be located external to the camera on another device e.g. a game system, personal computer, mobile device or other computing device.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 8:
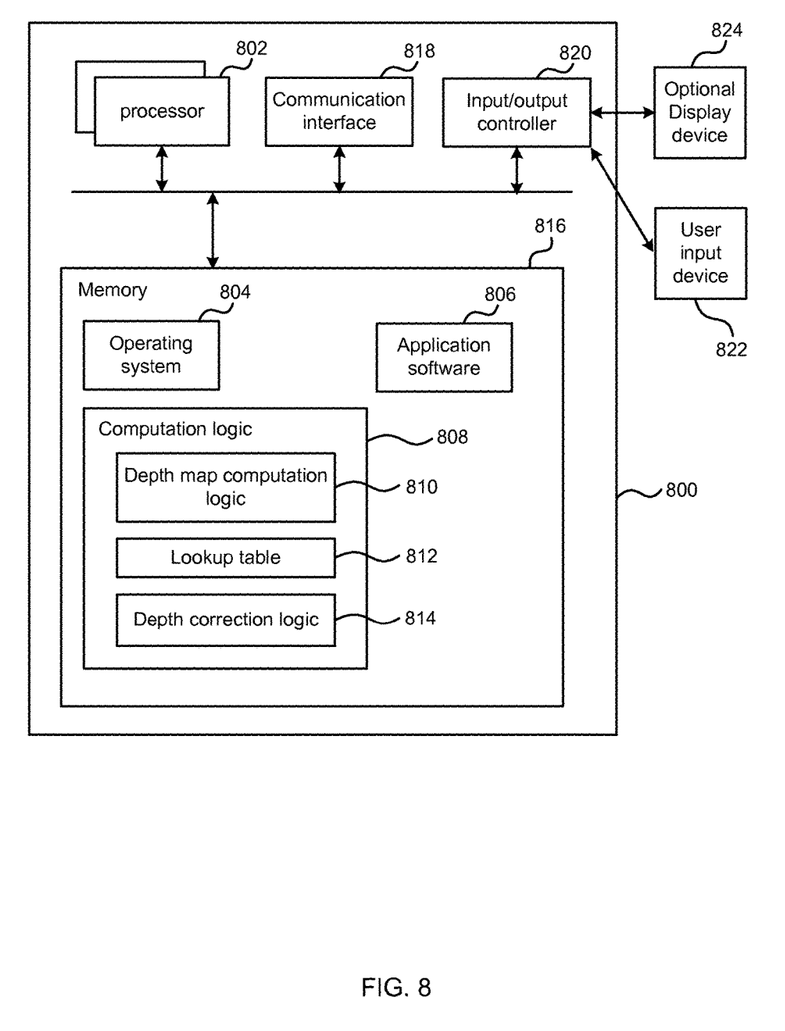
FIG. 8 illustrates an exemplary computing-based device in which embodiments of depth map correction using lookup tables may be implemented.

FIG. 8 illustrates various components of an exemplary computing-based device 800 which may be implemented as any form of a computing and/or electronic device, and in which embodiments of depth map correction using lookup tables may be implemented.

Computing-based device 800 comprises one or more processors 802 which may be microprocessors, controllers or any other suitable type of processors for processing computer executable instructions to control the operation of the device in order to. In some examples, for example where a system on a chip architecture is used, the processors 802 may include one or more fixed function blocks (also referred to as accelerators) which implement a part of the method of depth map correction using lookup tables in hardware (rather than software or firmware). For example, computation logic for computing depth maps may be implemented in hardware. Platform software comprising an operating system 804 or any other suitable platform software may be provided at the computing-based device to enable application software 806 to be executed on the device. In an example computing-based device 800 may further comprise computation logic 808. Computation logic 808 may further comprise integrated depth map computation logic 810, depth correction logic 814 and a stored depth correction lookup table 812 which may be arranged to operate as described above with reference to FIG. 7. In an example depth map computation logic 810 may be arranged to estimate a distance of an object from the difference in phase between light transmitted from the light source and the light received at the receiver. In various examples the received light has undergone at least two path reflection e.g. multipath reflection.

The computer executable instructions may be provided using any computer-readable media that is accessible by computing based device 800. Computer-readable media may include, for example, computer storage media such as memory 816 and communications media. Computer storage media, such as memory 816, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 816) is shown within the computing-based device 800 it will be appreciated that the storage may be distributed or located remotely and accessed via a network or other communication link (e.g. using communication interface 808).

The computing-based device 800 also comprises an input/output controller 820 arranged to output display information to a display device 824 which may be separate from or integral to the computing-based device 800. The display information may provide a graphical user interface. The input/output controller 820 is also arranged to receive and process input from one or more devices, such as a user input device 822 (e.g. a mouse, keyboard, camera, microphone or other sensor). In some examples the user input device 822 may detect voice input, user gestures or other user actions and may provide a natural user interface (NUI). This user input may be used to generate depth maps as described above. In an embodiment the display device 824 may also act as the user input device 822 if it is a touch sensitive display device. The input/output controller 820 may also output data to devices other than the display device, e.g. a locally connected printing device (not shown in FIG. 8).

Any of the input/output controller 820, display device 824 and the user input device 822 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
   receiving, at a processor, data comprising time of flight depth camera amplitude and phase measurements for a plurality of pixels of a camera, the data having six dimensions that correspond to amplitude and phase measurements for three modulation frequencies;
   identifying one frequency of the three modulation frequencies as a reference frequency;
   converting, at the processor, the data to generate a representation having five dimensions;
   based on the reference frequency and the representation, generating a plurality of integers corresponding to four dimensions;
   truncating at least one integer of the plurality of integers to generate a set of indices corresponding to the four dimensions;
   based on the set of indices, generating a look up table such that the look up table has the four dimensions;
   accessing the look up table having the four dimensions;
   computing an estimate of a distance of a surface from the camera using the time of flight depth camera amplitude and phase measurements for the plurality of pixels; and
   correcting, in real time, the computed estimate of distance for the plurality of pixels using a depth multipath correction value from the accessed look up table having the four dimensions.

2. A method as claimed in claim 1, wherein the time of flight depth camera amplitude and phase measurements are received for the three modulation frequencies such that the number of dimensions of the received data equals the three modulation frequencies times two.

3. A method as claimed in claim 1, further comprising accessing depth multi-path correction values from the look up table using at least some of the amplitude measurements in a normalized form, the amplitude measurements normalized in relation to a reference measurement of the amplitude measurements.

4. A method as claimed in claim 1, further comprising looking up the identified depth multi-path correction value from the look up table using at least some of the phase measurements in rotated form, the phase measurements rotated in relation to a reference measurement of the phase measurements.

5. A method as claimed in claim 1, wherein the look up table is a multi-dimensional look up table that stores an association between a plurality of amplitude and phase measurements and a corresponding depth multi-path correction value for the modulation frequencies associated with a light source.

6. A method as claimed in claim 1, wherein the depth multi-path correction values take into account at least a two path reflection.

7. A method as claimed in claim 1, further comprising:
   converting, at the processor, the data to generate a representation having five dimensions;
   based on the representation, generating the look up table such that the look up table has the five dimensions; and
   accessing the look up table having the five dimensions.

8. A method as claimed in claim 7, wherein the depth multi-path correction values take into account at least a two path reflection.

9. A method as claimed in claim 1 at least partially carried out using hardware logic.

10. A depth map correction apparatus comprising:
    a processor arranged to receive data comprising time of flight depth camera amplitude and phase measurements for a plurality of pixels, the data having six dimensions that correspond to amplitude and phase measurements for three modulation frequencies;
    depth map computation logic arranged to compute an estimate of a distance of a surface from the camera using the measurements; and
    depth map correction logic arranged to:
      identify one frequency of the three modulation frequencies as a reference frequency;
      convert the data to generate a representation having five dimensions;
      based on the reference frequency and the representation, generate a plurality of integers corresponding to four dimensions;
      truncate at least one integer of the plurality of integers to generate a set of indices corresponding to the four dimensions;
      based on the set of indices, generate a look up table such that the look up table has the four dimensions;
      access the look up table having the four dimensions;
      compute an estimate of a distance of a surface from the camera using the time of flight depth camera amplitude and phase measurements for the plurality of pixels;
      correct the computed estimate of distance for the plurality of pixels using a depth multipath correction value from the accessed look up table having the four dimensions.

11. An apparatus as claimed in claim 10 where the processor is arranged to receive the data in the form of complex measurements expressing the amplitude and phase measurements for more than the three modulation frequencies.

12. An apparatus as claimed in claim 11 where the depth map correction logic is arranged to use the received complex measurements to index at least one entry from the look up table.

13. An apparatus as claimed in claim 10 wherein the look up table is a four dimensional look up table generated based on a set of indices, the set of indices including a first index corresponding to a truncated integer.

14. A system for correction of multipath reflection in a depth map comprising:

depth map computation logic arranged to estimate a distance of an object from the difference in phase between light transmitted from a light source and reflected light detected by a receiver, the depth map computation logic being stored at a memory or one or more computation logic hardware components; and a processor arranged to receive data comprising time of flight depth camera amplitude and phase measurements for a plurality of pixels, the data having six dimensions that correspond to amplitude and phase measurements for three modulation frequencies;

depth map correction logic arranged to:
identify one frequency of the three modulation frequencies as a reference frequency;
convert the data to generate a representation having five dimensions;
based on the reference frequency and the representation, generate a plurality of integers corresponding to four dimensions;
truncate at least one integer of the plurality of integers to generate a set of indices corresponding to the four dimensions;
based on the set of indices, generate a look up table such that the look up table has the four dimensions;
access the look up table having the four dimensions;
compute an estimate of a distance of a surface from the camera using the time of flight depth camera amplitude and phase measurements for the plurality of pixels;
correct the computed estimate of distance for the plurality of pixels using a depth multipath correction value from the accessed look up table having the four dimensions.

15. A system as claimed in claim 14 comprising a memory storing the look up table.

16. A system as claimed in claim 14 wherein the received light has undergone a multi-path reflection.

17. A system as claimed in claim 14, wherein the depth map correction logic is further arranged to adjust the three modulation frequencies and normalize the six dimensions corresponding to the amplitude and phase measurements.

18. A system as claimed in claim 14 wherein a phase modulation time of flight camera comprises the depth map computation logic.

19. A system as claimed in claim 14 further comprising a gaming system and wherein the gaming system comprises the depth map computation logic.

20. A system as claimed in claim 14, wherein the depth map computation logic is at least partially implemented using hardware logic selected from any one or more of a field-programmable gate array, a program-specific integrated circuit, a program-specific standard product, a system-on-a-chip, or a complex programmable logic device.

* * * * *